United States Patent
Wang et al.

(10) Patent No.: US 7,883,647 B2
(45) Date of Patent: Feb. 8, 2011

(54) METHOD OF MAKING LUMINANCE ENHANCEMENT OPTICAL SUBSTRATES WITH OPTICAL DEFECT MASKING STRUCTURES

(75) Inventors: Kong-Hua Wang, Taipei (TW); Craig Lin, Taipei (TW); Daniel Yaw-Chung Ko, Taipei (TW)

(73) Assignee: Ubright Optronics Corporation, Taipei (TW)

(*) Notice: Subject to any disclaimer, the term of this patent is extended or adjusted under 35 U.S.C. 154(b) by 345 days.

(21) Appl. No.: 11/825,139

(22) Filed: Jul. 2, 2007

(65) Prior Publication Data

US 2008/0019146 A1    Jan. 24, 2008

Related U.S. Application Data

(60) Provisional application No. 60/818,044, filed on Jun. 30, 2006.

(51) Int. Cl.
*B29D 11/00* (2006.01)
(52) U.S. Cl. .......................... 264/1.7; 264/2.5; 349/192
(58) Field of Classification Search ............ 264/1.1, 264/1.7, 2.5; 425/808; 349/62, 95, 117, 349/192; 362/606
See application file for complete search history.

(56) References Cited

U.S. PATENT DOCUMENTS

| | | | |
|---|---|---|---|
| 4,542,449 A | 9/1985 | Whitehead | |
| 5,005,108 A | 4/1991 | Pristash et al. | |
| 5,175,030 A | 12/1992 | Lu et al. | |
| 5,183,597 A | 2/1993 | Lu | |
| 5,280,371 A | 1/1994 | McCartney, Jr. et al. | |
| 5,579,163 A | 11/1996 | Peterson | |
| 5,771,328 A | 6/1998 | Wortman et al. | |
| 5,779,337 A | 7/1998 | Saito et al. | |
| 5,917,664 A | 6/1999 | O'Neill et al. | |
| 5,919,551 A | 7/1999 | Cobb, Jr. et al. | |
| 6,091,547 A | 7/2000 | Gardiner et al. | |

(Continued)

FOREIGN PATENT DOCUMENTS

CN    1769972    5/2006

(Continued)

OTHER PUBLICATIONS

International Search Report of Counterpart PCT Application No. PCT/US2007/015364.

(Continued)

*Primary Examiner*—Mathieu D. Vargot
(74) *Attorney, Agent, or Firm*—Liu & Liu

(57) ABSTRACT

An optical substrate possesses a structured surface that enhances luminance or brightness and reduces the effects of structural defects on perceived image quality. User perceivable image cosmetic defects caused by manufacturing or handling, can be masked by introducing structural irregularities in the optical substrate, which may be non-facet flat sections or in-kind to the defects. Optical defects caused by non-facet flat sections in the prism structure of the optical substrate (e.g., flat-bottom valleys with a certain valley bottom thickness above the base layer, and/or flat-top peaks, and/or openings in the optical substrates that expose flat sections of underlying base layer) can be masked by providing distributed in-kind non-facet flat sections (e.g., flat-bottom valleys, and/or flat-top peaks, and/or openings exposing sections of underlying base layer), to diffuse the prominence of the original defects with the introduced irregularities.

20 Claims, 7 Drawing Sheets

U.S. PATENT DOCUMENTS

| | | |
|---|---|---|
| 6,330,386 B1 | 12/2001 | Wagner et al. |
| 6,354,709 B1 | 3/2002 | Campbell et al. |
| 6,707,611 B2 | 3/2004 | Gardiner et al. |
| 6,783,349 B2 | 8/2004 | Neavin et al. |
| 6,797,366 B2 | 9/2004 | Hanson et al. |
| 6,808,658 B2 | 10/2004 | Stover |
| 6,827,886 B2 | 12/2004 | Neavin et al. |
| 6,862,141 B2 | 3/2005 | Olczak |
| 2001/0011779 A1 | 8/2001 | Stover |
| 2001/0013668 A1 | 8/2001 | Neavin et al. |
| 2001/0022982 A1 | 9/2001 | Neavin et al. |
| 2002/0057497 A1 | 5/2002 | Gardiner et al. |
| 2002/0146296 A1 | 10/2002 | Schmitz et al. |
| 2003/0112521 A1 | 6/2003 | Gardiner et al. |
| 2003/0227768 A1 | 12/2003 | Hara et al. |
| 2004/0061944 A1 | 4/2004 | Kashima et al. |
| 2004/0090572 A1 | 5/2004 | Han et al. |
| 2004/0105157 A1 | 6/2004 | Matsushita et al. |
| 2004/0246599 A1 | 12/2004 | Nilsen |
| 2005/0001043 A1 | 1/2005 | Gardiner et al. |
| 2005/0024849 A1 | 2/2005 | Parker et al. |
| 2005/0110175 A1 | 5/2005 | Stover |
| 2005/0122591 A1 | 6/2005 | Parker et al. |
| 2005/0141243 A1 | 6/2005 | Mullen et al. |
| 2005/0280752 A1 | 12/2005 | Kim et al. |
| 2006/0047358 A1 | 3/2006 | Liang et al. |

FOREIGN PATENT DOCUMENTS

| | | |
|---|---|---|
| EP | 1455203 | 9/2004 |
| WO | 9936248 | 7/1999 |
| WO | 99/42861 | 8/1999 |
| WO | 2005026793 | 3/2005 |
| WO | 2006073033 | 7/2006 |

OTHER PUBLICATIONS

International Search Report of Related Case PCT Application No. PCT/US2006/046689.
International Search Report of Related Case PCT Application No. PCT/US2006/022812.

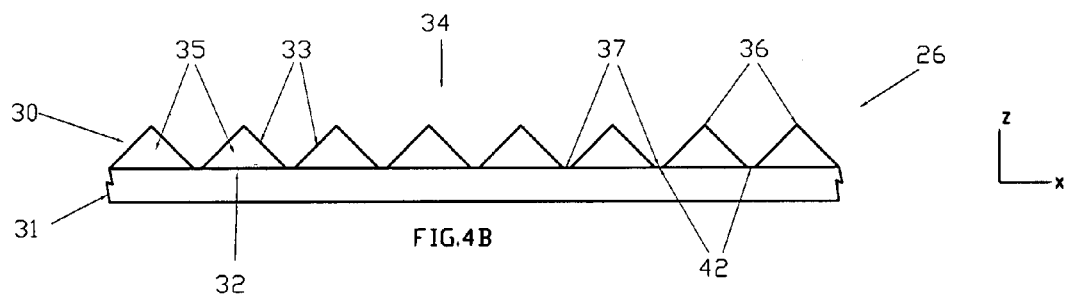
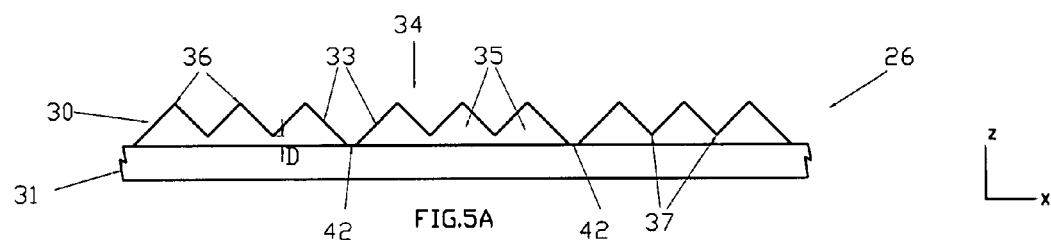
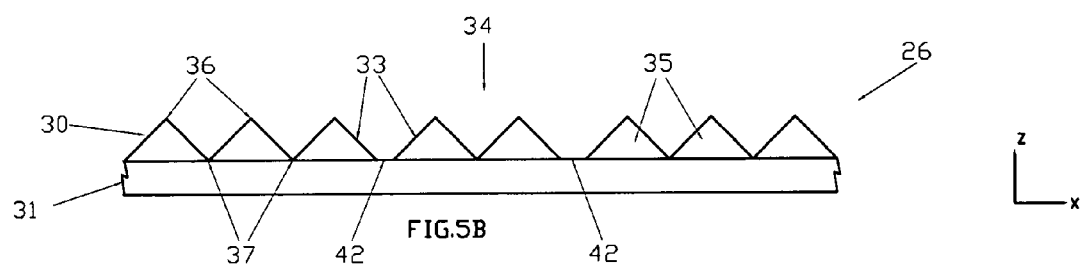
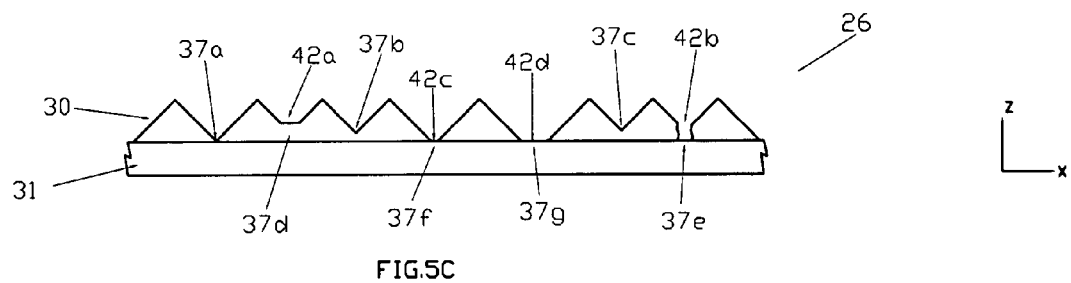

METHOD OF MAKING LUMINANCE ENHANCEMENT OPTICAL SUBSTRATES WITH OPTICAL DEFECT MASKING STRUCTURES

This application claims the priority of U.S. Provisional Application No. 60/818,044, filed Jun. 30, 2006. This document is fully incorporated by reference as if fully set forth herein.

The publications noted in the disclosure herein are each fully incorporated by reference, as if fully set forth in its entirety herein.

BACKGROUND OF THE INVENTION

1. Field of the Invention

The present invention relates to optical substrates having a structured surface, particularly to optical substrates for brightness enhancement, and more particularly to brightness enhancement substrates for use in flat panel displays having a planar light source.

2. Description of Related Art

Flat panel display technology is commonly used in television displays, computer displays, and handheld electronics (e.g., cellular phones, personal digital assistants (PDAs), etc.). Liquid crystal display (LCD) is a type of flat panel display, which deploys a liquid crystal (LC) module having an array of pixels to render an image. In backlight LCDs, brightness enhancement films use prismatic structures to direct light along the viewing axes (i.e., normal to the display), which enhances the brightness of the light viewed by the user of the display and which allows the system to use less power to create a desired level of on-axis illumination.

Heretofore, brightness enhancement films were largely provided with parallel prismatic grooves, lenticular lenses or pyramids on the light emitting surface of the films, which change the angle of the film/air interface for light rays exiting the films and cause light incident obliquely at the other surface of the films to be redistributed in a direction more normal to the exit surface of the films. The brightness enhancement films have a light input surface that is smooth, through which light enters from the backlight module.

Heretofore, brightness enhancement films are made up of two layers, including a support base layer and a structured layer. FIG. 1 depicts a sectional structure representative of prior art brightness enhancement films. The brightness enhancement film 100 includes a base layer 102 made of polyethylene terephthalate (PET), and a structured layer 104 of prism structures made of acrylic, which function to redirecting light.

The structured surface of brightness enhancement film 100 is formed after bonding a layer of materials (e.g., an acrylic or polycarbonate layer) to the base layer 102 prior to forming the prism structures in the acrylic layer to form the structured layer 104. The prism structures in the structured layer 104 may be formed using a number of process techniques, including micromachining using hard tools to form master molds or the like for forming the prism structures. The hard tools may be very small diamond tools mounted on CNC (Computer Numeric Control) machines (e.g. turning, milling and ruling/shaping machines), such as known STS (Slow Tool Servo) and FTS (Fast Tool Servo). U.S. Pat. No. 6,581,286, for instance, discloses one of the applications of the FTS for making grooves on an optical film by using a thread cutting method. The tool is mounted onto the machine, to create longitudinal prisms in a plane. The mold may be used to form the structured layer through hot embossing a substrate, and/or through the addition of an ultraviolet curing or thermal setting materials in which the structures are formed.

As shown in FIG. 1, the bottom of the valleys 106 of the prisms in the structured layer 104 is not at the surface of the base layer 102, but spaced at a distance d from the contacting surface of the base layer by acrylic material. In general, the valley bottom thickness d range between 0.3 to 3 micrometers. In order to obtain the bottom thickness, several parameters must be controlled during the curing process to form the structured surface. It has been found that due to inherent limitations during manufacturing processes (including the mold forming process and the structured surface forming process), it is challenging to control a consistent valley bottom thickness d. As noted in the earlier filed U.S. patent application Ser. No. 11/635,802 (which is incorporated by reference herein), unwanted optical cosmetic defects such as 'chatter' and/or non-uniformity of the brightness enhancement film are introduced as a result of non-uniformity in the valley bottom thickness in the structured layer. This results in a phenomenon that is easily seen for existing brightness enhancement films, in which repeated dark shades/lines are seen from the planar light source transmitted through the brightness enhancement film.

The valley bottom thickness can be completely missing (i.e., without resin above the base layer, exposing the base layer) at some locations in the structured layer, as a result of defects introduced by the manufacturing processes, as affected by, for example, the manufacturing conditions, environmental specifications and handling processes. The locations with missing valley bottom thickness create optical cosmetic artifacts in the displayed image which are perceivable to a naked eye, such as white spots and white lines in the display image. The artifacts are perceivable because of the high contrast between the exposed base layer and surrounding unexposed areas. For example, a white line defect (see FIG. 1 at 108) is the result of a gap (e.g., 5 µm wide by 620 µm length) of no valley bottom thickness between two prisms, which may be caused by the replication process using the mold. A white spot defect (see FIG. 1 at 109) is the result of a spot (e.g., a 8 µm by 20 µm to 15 µm by 40 µm hole, or even larger 20 µm by 70 µm hole) of no valley bottom thickness at a spot along a valley, which may be caused during releasing the structured layer film from the mold, as resin (e.g., acrylic) was left on the surface of the mold. Other defects may include a row of holes lined up to result in a white line defect in the displayed image viewed by the naked eye.

On the other hand, careless handling may damage the peaks, valleys and/or facets of prisms, for example, by scratches or cutting marks. Other physical conditions and structural deficiencies may also expose the base layer and/or damage prism peaks, valleys and/or facets, for example, cracks and indentations in the structured layer, and foreign particles or materials introduced during molding process but subsequently released from the structured layer.

The push to improve image quality elevates the cosmetic requirements of luminance enhancement optical substrates. A viewer may easily perceive even very small isolated defects. To overcome the optical cosmetic defects noted above, several approaches have been attempted. One solution is to provide a very clean room and use extraordinary care in the manufacturing process, and employ extremely critical quality control procedures. This will significantly decrease throughput, and also highly increase production costs. Another solution is to provide a diffuser to the display. Diffusers with matte structures may mask many of the defects and increase the production yield. This solution, however, increases the components used and enlarges the volume and weight of the display.

What is needed is an optical substrate structure that both enhances brightness and reduces the effects of structural defects on perceived image quality.

SUMMARY OF THE INVENTION

The present invention is directed to a luminance enhancement film comprising an optical substrate (which may be supported by a base layer) that possesses a structured surface that enhances luminance or brightness and reduces the effects of structural defects on perceived image quality. In accordance with the present invention, user perceivable optical cosmetic defects caused by manufacturing or handling can be masked by introducing defined structural irregularities in the optical substrate. The optical cosmetic defects would be blended with the optical effects introduced by such structural irregularities, with the cosmetic defects reduced in prominence in the display image, to effectively hide, mask or largely reduce certain cosmetic defects.

In one aspect of the present invention, the pre-defined irregularities introduced may be in-kind to the anticipate defects. In one embodiment of the present invention, optical defects of the type comprising non-facet flat sections in the prism structure of the optical substrate (e.g., flat-bottom valleys with a certain valley bottom thickness above the base layer, and/or flat-top peaks, and/or openings in the optical substrates that expose flat sections of underlying base layer) can be masked by providing distributed in-kind irregularities having defined non-facet flat sections (e.g., flat-bottom valleys, and/or flat-top peaks, and/or openings exposing sections of underlying base layer), to diffuse the prominence of the original defects with the introduced irregularities. The in-kind irregularities introduced may not need to be of the exact same type, number, shape and size as the original defects. For example, openings (e.g., holes or gaps) in the optical substrate exposing flat sections of the underlying base layer, or flat-bottom valleys, or flat-top peaks, may be masked by at least one of flat-bottom valleys and/or flat-top peaks and/or openings exposing flat sections of underlying base layer. If the defects are other than non-facet flat sections noted above, the in-kind irregularities intentional introduced into the optical substrate would likewise take on in-kind attributes other than non-facet flat sections.

In another aspect of the present invention, regardless of the anticipated defects, the irregularities introduced may simply be defined non-facet flat sections (e.g., flat-bottom valleys, and/or flat-top peaks, and/or openings exposing sections of an underlying base layer). The non-facet flat-sections of the irregularities may still mask other types of defects found on the prism structure of the optical substrate, such as made by, for example, scratches, cutting marks, cracks, indentations and/or other unintended structural defects in the prism structure, and/or foreign particles or materials introduced during molding process, which may or may not be subsequently released from the prism structure. The defects may be found anywhere on the prism structure (e.g., prism peaks, valley and/or facets, and/or underlying layer, if present, which supports the optical substrate).

The predefined irregularities introduced may be distributed across the optical substrate in an orderly, semi-orderly, random, or quasi-random manner. The predefined irregularities introduced may not mask all types of defects present in an actual luminance enhancement substrate. The predefined irregularities to be deployed in an actual luminance enhancement substrate may comprise several types of irregularities (e.g., a combination of non-facet flat sections, in-kind or otherwise, and other irregularities that are neither in-kind nor non-facet flat sections).

The optical substrate may have a base portion (which may be unitary or monolithic to the prism structure, which is equivalent to and having similar characteristics as a separate underlying base layer), which has sufficient thickness to provide structural integrity to the final luminance enhancement film.

BRIEF DESCRIPTION OF THE DRAWINGS

For a fuller understanding of the nature and advantages of the invention, as well as the preferred mode of use, reference should be made to the following detailed description read in conjunction with the accompanying drawings. In the following drawings, like reference numerals designate like or similar parts throughout the drawings.

FIG. 4B is a sectional view taken along line 4B-4B in FIG. 4A.

FIGS. 5A to 5C are sectional views of structured output surfaces of optical substrates, in accordance with further embodiments of the present invention.

DETAILED DESCRIPTION OF THE ILLUSTRATED EMBODIMENTS

The present description is of the best presently contemplated mode of carrying out the invention. This invention has been described herein in reference to various embodiments and drawings. This description is made for the purpose of illustrating the general principles of the invention and should not be taken in a limiting sense. It will be appreciated by those skilled in the art that variations and improvements may be accomplished in view of these teachings without deviating from the scope and spirit of the invention. The scope of the invention is best determined by reference to the appended claims.

The present invention is directed to luminance enhancement substrate having an optical substrate (which may be supported by a base layer) that possesses a structured surface that enhances luminance or brightness and reduces the effects of structural defects on perceived image quality. In accordance with the present invention, user perceivable optical cosmetic defects caused by manufacturing or handling can be masked, largely reduced, or reduced in prominence by introducing defined structural irregularities in the optical substrate, which may be in-kind to the anticipated defects.

The optical defect masking aspect of the present invention is applicable to various optical substrates having various types of structured light output surfaces. The optical substrate may be in the form of a film, sheet, plate, and the like, which may be flexible or rigid, having a two or three-dimensionally varying, structured light output surface that comprises a regular and/or irregular prism structure, and a non-structured, smooth, planar, light input surface. The prism structure at the light output surface may be viewed as comprising longitudinal regular and/or irregular prism and/or prism blocks arranged generally laterally (side-by-side), defining peaks and valleys (a facet is defined between each adjacent peak and valley). In one embodiment, the light output surface and the light input surface are generally parallel to each other in the overall optical substrate structure (i.e., do not form an overall substrate structure that is generally tapered, concave, or convex). In another embodiment, the optical substrate structure may be regular prism structure at the light output surface, which may be viewed as comprising side-by-side or lateral rows of regular prism blocks wherein the peaks or valleys of adjacent rows of prism blocks may be parallel.

Figure 2:
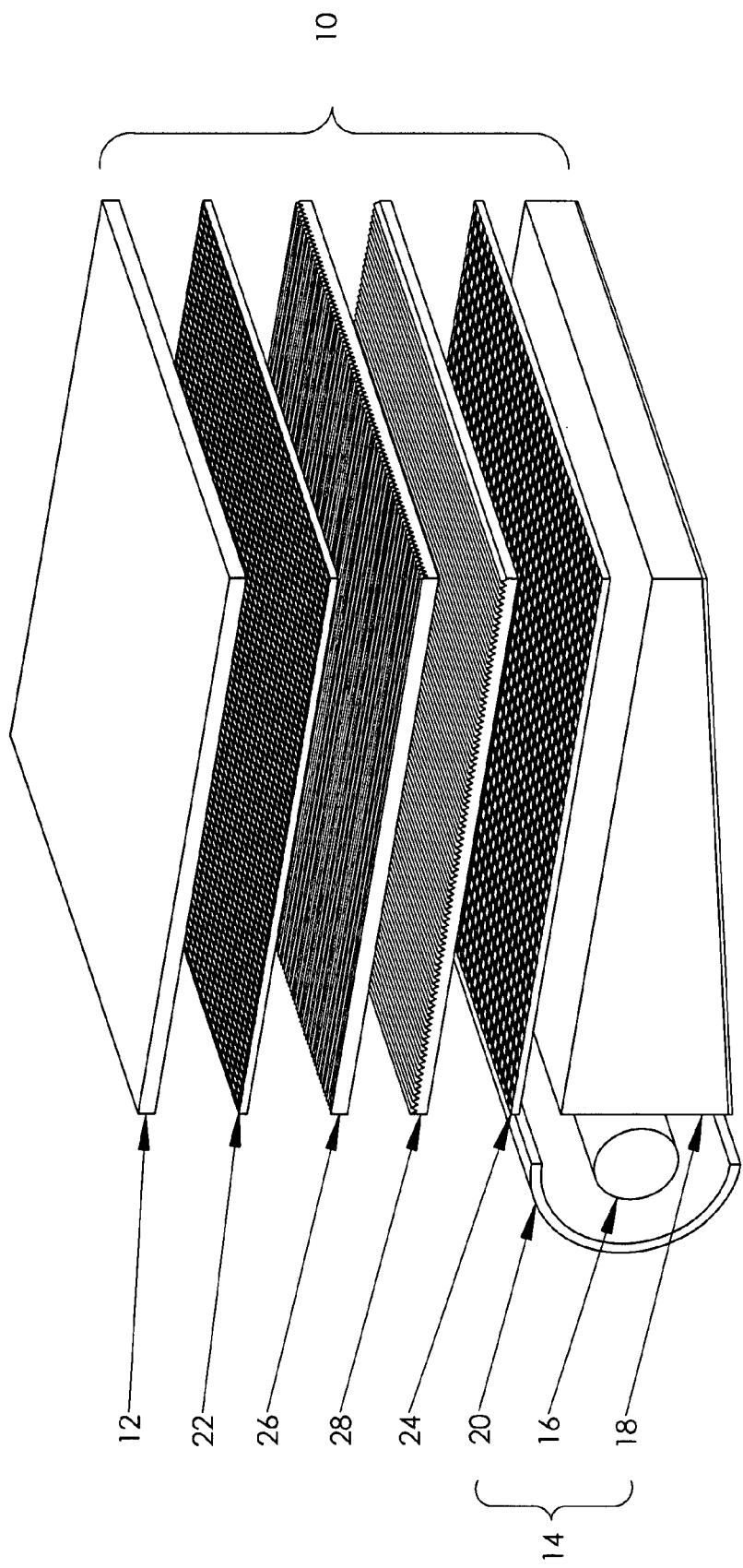
FIG. 2 schematically illustrates the structure of an LCD having an optical substrate, in accordance with one embodiment of the present invention.

FIG. 2 illustrates an example of a flat panel display. A backlight LCD 10, in accordance with one embodiment of the present invention, comprises a liquid crystal (LC) display module 12, a planar light source in the form of a backlight module 14, and a number of optical films interposed between the LC module 12 and the backlight module 14. The LC module 12 comprises liquid crystals sandwiched between two transparent substrates, and control circuitry defining a two-dimensional array of pixels. The backlight module 14 provides planar light distribution, either of the backlit type in which the light source extends over a plane, or of the edge-lit type as shown in FIG. 2, in which a linear light source 16 is provided at an edge of a light guide 18. A reflector 20 is provided to direct light from the linear light source 16 through the edge of the light guide 18 into the light guide 18. The light guide is structured (e.g., with a tapered plate and light reflective and/or scattering surfaces defined on the bottom surface facing away from the LC module 12) to distribute and direct light through the top planar surface facing towards LC module 12. The optical films may include upper and lower diffuser films 22 and 24 that diffuse light from the planar surface of the light guide 18. The optical films further include a structured surface optical substrate in accordance with the present invention, which redistributes the light passing through such that the distribution of the light exiting the films is directed more along the normal to the surface of the films. In the illustrated embodiment, there are two structured optical substrates 26 and 28 (which may be similar) in accordance with the present invention, which are arranged with the longitudinal prism structures generally orthogonal between the two substrates. The optical substrates 26 and 28 are often referred in the art as luminance or brightness enhancement films, light redirecting films, and directional diffusing films. The light entering the LC module 12 through such a combination of optical films is uniform spatially over the planar area of the LC module 12 and has relatively strong normal light intensity. The optical substrates in accordance with the present invention may be used with LCDs to be deployed for displays, for example, for televisions, notebook computers, monitors, portable devices such as cell phones, PDAs and the like, to make the displays brighter.

Figure 3:
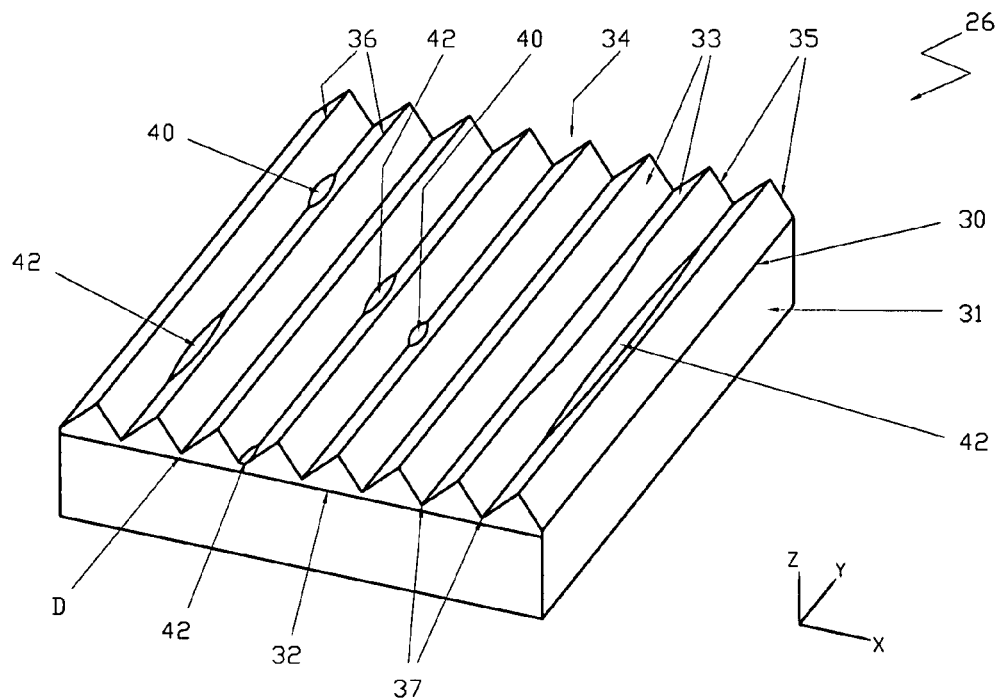
FIG. 3 is a schematic perspective view of the structured light output surface of an optical substrate, in accordance with one embodiment of the present invention.

Refer to FIG. 3, the brightness enhancement film 26 of the present invention includes an optical substrate 30 adhered to a support or base layer 31. FIG. 3 (as well as the embodiments illustrated in the other figures) may schematically represent the features of a section of an optical substrate 30 or an entire substrate 30. The optical substrate has a light input surface 32 that is planar and smooth, and a light output surface 34 that has a prismatic structure that may be viewed as comprising longitudinal regular prism blocks 35 arranged in lateral rows (i.e., side-by-side). A prism block 35 may be viewed as a building block for the optical substrate. It is noted that, as will be apparent in the discussion herein below, the prism blocks 35 are connected to adjoining prism blocks 35 in longitudinal and/or lateral directions. Because the prism blocks 35 are not in fact individual discrete blocks assembled together, the material of the prism blocks 35 are in a continuum or continuous monolithic structure, with no physical contact surfaces or joining surfaces per se.

Figure 1:
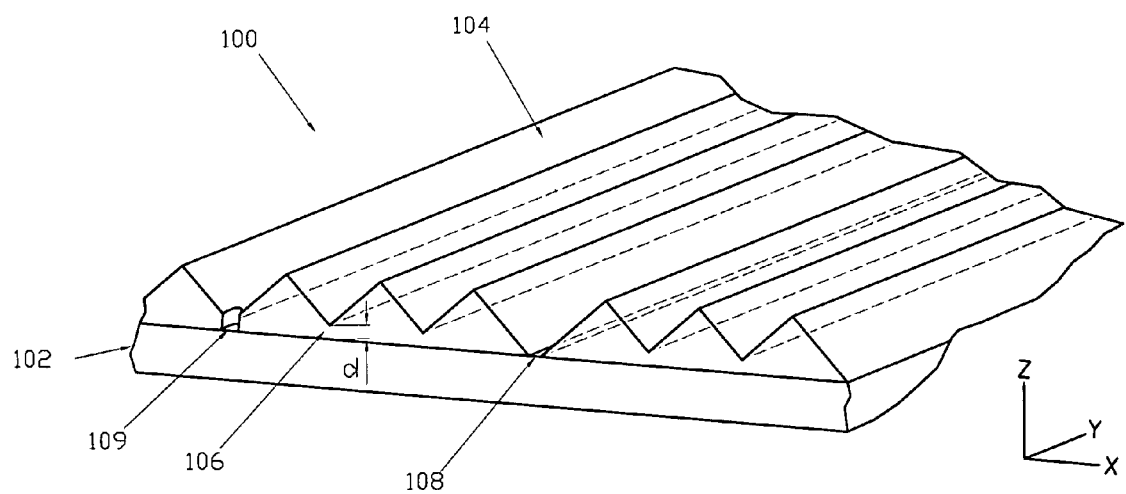
FIG. 1 schematically illustrates a sectional view of a prior art brightness enhancement film.

In one embodiment of the present invention, the light output surface 34 and the light input surface 32 are generally parallel to each other in the overall optical substrate structure (i.e., do not form an overall substrate structure that is generally tapered like a light guide plate in a backlight module, or that is concave or convex). While FIG. 3 shows the base 31 to be of uniform thickness, it may be non-uniform thickness. The end section of FIG. 3 when enlarge would look generally similar to FIG. 1, with the exception of the presence of any defects 40 or irregularities 42 discussed below.

The prism blocks 35 each has two longitudinal facets 33, or longitudinal flat surfaces, forming a longitudinal peak 36. The facets 33 of adjoining prism blocks 35 intersect to define a valley 37. The facets 33 are slanted with respect to the light input surface 32, which provide intended optical reflections and refractions in connection with luminance enhancement. The facets 33 are distinguished from non-facet surfaces. Non-facet surfaces instead refer to flat structures generally parallel to the light input surface 32, or facing generally in the z-direction (defined below). Non-facet surfaces may be unintended structural defects in the prismatic structure, which may arise from manufacturing or handling, or intentionally introduced irregularities for masking the optical defects caused by such original structural defects, as further discussed below.

For ease of reference, the following orthogonal x, y, z coordinate system would be adopted in explaining the various directions. As shown in FIG. 3, the x-axis is in the direction across the peaks and valleys, also referred to as the lateral direction. The y-axis is orthogonal to the x-axis, in the plane of the substrate 30, in a generally longitudinal direction of the prism blocks 35. The prism blocks may be regular or irregular (as disclosed in copending U.S. patent application Ser. No. 11/450,145, commonly assigned to the assignee of the present invention, and is fully incorporated by reference herein). In the illustrated embodiment, the prism blocks 35 are regular in geometry. The light input surface 32 lies in an x-y plane. For a rectangular piece of the optical substrate, the x and y-axes would be along the orthogonal edges of the substrate 30. The z-axis is orthogonal to the x and y-axes. The edge showing the ends of the lateral rows of the prism blocks 35 lies in the x-z plane, such as shown in FIG. 3. References to cross sections of a prism block 35 would be sections taken in x-z planes, at various locations along the y axis. Further, references to a horizontal direction would be in an x-y plane, and references to a vertical direction would be in the z-direction. Hereinafter, references to heights of peaks and valleys are measured in the z-direction with respect to the interfacing planar surface between the adjoining substrate 30 and base layer 31. It is noted that the references to peak vertex angles herein refer to the angles of the peak 36, and valley vertex angles herein refer to the angles of the valleys 37, as viewed along cross sections in the x-z planes at locations along the y direction, as defined above.

In the illustrated embodiment, the prism blocks 35 are shown to be substantially similar to one another, and have uniform cross-sections along the longitudinal direction (y-axis). The peak vertex angles are similar (70 to 110 degrees), and the valley vertex angles are also similar to one another (70 to 110 degrees). It is noted that in the illustrated sectional views in x-z planes, the peak vertex angles and the valley vertex angles may be rounded instead of a sharp point, due to manufacturing constraints. The height of the valleys 37 may vary in the lateral (x) direction of the respective valleys 37, and may also further vary in the longitudinal (y) direction. The prism blocks may possess a structure having structure, geometry and features that are disclosed in earlier filed copending U.S. patent applications Ser. Nos. 11/450,145 and 11/635,802, which have been commonly assigned to the assignee of the present invention, and which had been incorporated by reference herein.

There is a thin layer of material of thickness d (similarly shown in FIG. 1) below the valleys 37 in the optical substrate 30, which defines a valley bottom thickness or valley height above the top surface of the base layer 31, except where structural defects 40 arose from manufacturing or handling, and where irregularities 42 have been intentionally introduced in accordance with the present invention. The valley bottom thickness could vary across the lateral direction or longitudinal direction, from substantially zero thickness, to a defined thickness D (e.g., 0.3 to 10 micrometers), with the exception at those locations where defects 40 (from manufacturing and handling) and irregularities 42 (introduced in accordance with the present invention) cause the base layer 31 to be exposed without coverage of material of the optical substrate 30. In the illustrated embodiment in FIG. 3, the heights, or bottom thickness, of the valleys 37 are constant, with bottom thickness is D, with the exception of above noted defects 40 and irregularities 42. Only a few scattered defects 40 and irregularities 42 are schematically illustrated in FIG. 3. The number, extent and coverage of the irregularities 42 to effectively mask optical defects perceivable by a user may be more than what is schematically illustrated in FIG. 3.

In the disclosed embodiments, the defects 40 are generally unintended, isolated, randomly generated (e.g., inherent from manufacturing and/or handling), non-facet flat sections in the prism structure of the optical substrate. For example, the non-facet flat sections may be present as flat-bottom valleys with a certain valley bottom thickness above the base layer, and/or flat-top peaks, and/or openings in the light input surface 32 of the optical substrate which expose flat sections of the underlying base layer. The non-facet flat sections of defects 40 may be of various shapes, geometries and sizes (e.g., longitudinal, or spots). The defects may be defined along valleys between adjacent prism blocks in the structured surface, either with adjacent facets extending to the top surface of the base layer 31 to define a flat-bottom valley (i.e., an opening at the light input surface 32, with the flat-bottom valley floor defined by the top surface of the underlying base layer 31), or facets extending to a flat section of the optical substrate material (to define a flat-bottom valley within the optical substrate 30), or with an opening extending through the valley bottom (the opening having generally vertical sidewalls through the valley bottom). By nature of defects, the actual defects 40 present on a single optical substrate 30 (and hence luminance enhancement film 26) may comprise a combination of the various forms of defects noted above, depending on the defects typically encountered as a result of manufacturing processes and handling. The defects 40 may be caused by molding defects, mold release, abrasion, scratches, etc.

In accordance with the present invention, perceivable optical cosmetic defects caused by the structural defects in the optical substrate 30 can be effectively masked from perception by distributing pre-defined structural irregularities in the optical substrate 30, which may be in-kind to the anticipated defects. In one embodiment, the irregularities 42 may be in-kind to the anticipated defects, which take similar form (e.g., similar characteristic physical attributes) as the defects 40. For example, the defects 40 can be masked by distributing intentionally introduced, in-kind, pre-defined non-facet flat sections (e.g., flat-bottom valleys, and/or flat-top peaks, and/or openings exposing sections of underlying base layer), to diffuse the prominence of the original defects with the introduced irregularities. The in-kind irregularities 42 introduced may not need to be of the exact same type, number, shape and size as the original defects 40, but share similar physical attributes significant to masking those defects (e.g., non-facet flat-sections). For example, openings (e.g., holes or gaps) in the optical substrate 30 exposing flat sections of the underlying base layer 31, or flat-bottom valleys, or flat-top peaks, may be masked by at least one of flat-bottom valleys and/or flat-top peaks and/or openings exposing flat sections of underlying base layer. The irregularities introduced may be distributed across the optical substrate in an orderly, semi-orderly, random, or quasi-random manner.

The in-kind irregularities 42 intentionally introduced into the optical substrate 30 may comprise non-facet flat sections of various forms, such as in the form of openings defined in the light input surface 32 of various shapes, geometries and sizes (e.g., longitudinal gaps, holes that are elliptical, rhombus, oval, round, etc.), flat-bottom valleys, and/or flat-top peaks. The non-facet flat irregularities 42 may be defined along valleys between adjacent prism blocks in the structured surface, either with adjacent facets extending to the top surface of the base layer 31 to define a flat-bottom valley (i.e., an opening at the light input surface 32, with the flat-bottom valley floor defined by the top surface of the underlying base layer 31), or facets extending to a flat section of the optical substrate material (to define a flat-bottom valley within the optical substrate 30), or with an opening extending through the valley bottom (the opening having generally vertical sidewalls through the valley bottom). The non-facet flat irregularities may range in width (in the x-direction) on the order of 0.5 to 200 μm, and range in length (in the y-direction) on the order of 1.0 μm to 500 mm.

The irregularities introduced may be distributed across the optical substrate in an orderly, semi-orderly, random, or quasi-random manner.

Figure 4A:
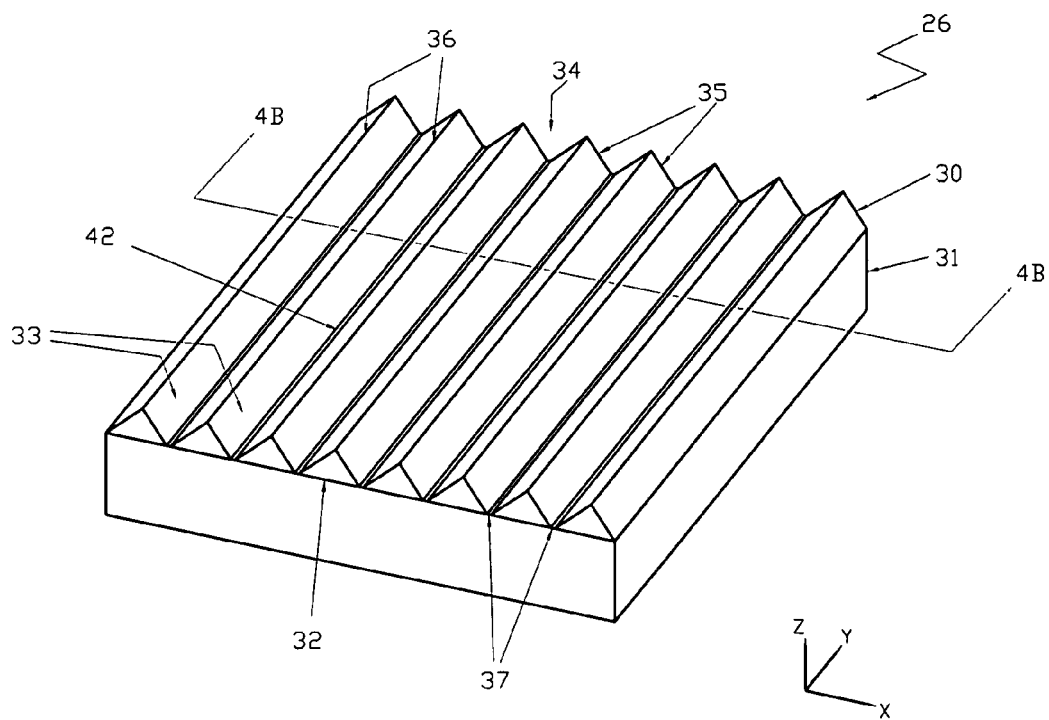
FIG. 4A is a schematic perspective view of the structured light output surface of an optical substrate, in accordance with another embodiment of the present invention.

FIGS. 4A and 4B illustrate another specific embodiment of irregularities 42, which take the form of flat-bottom valleys defined by longitudinal, narrow-band, non-facet flat irregularities extending substantially along the entire length of the valleys between adjacent prism blocks 35. (It is noted that defects 40 are not shown in these and further figures discussed below, to simplify illustration and discussion.) In the embodiment of FIGS. 4A and 4B, the width of the flat-bottom valleys is uniform along the valleys and the widths of the different valleys are same. The width of the valleys may vary along the valleys. Further, the valleys may vary in width and shape, as illustrated in FIGS. 5A-5C.

FIGS. 5A to 5C illustrate sectional views of other embodiments of longitudinal irregularities 42, varying from the embodiment shown in FIG. 4. The irregularities 42 having flat bottom valleys may be distributed every n prism blocks 35 (n may vary across the substrate). In the particular illustrated embodiment of FIG. 5A, an irregularity 42 having a flat bottom valley of a particular width (e.g., same width for the irregularities 42) is disposed every three prism blocks 35. The valleys 37 may have a valley bottom thickness D. FIG. 5B illustrates another embodiment in which an irregularity 42 having a flat bottom valley of a particular width (e.g., same width for the irregularities 42) is disposed alternately every two to three prism blocks 35. In this embodiment, valleys 37 may have a valley bottom of substantially zero thickness (i.e., the bottom of the valley is substantially coplanar with the light input surface 32 or the top surface of the base layer 31).

While each of the above discussed embodiments illustrates a single type of irregularities 42 uniformly distributed, the irregularities 42 may comprise a combination of two of more types of intentionally introduced irregularities discussed above, which may be distributed in a random, quasi-random, orderly, or quasi-orderly manner.

FIG. 5C illustrates further varying distribution of irregularities 42. In FIG. 5C (which could be a sectional view at a particular y-location of an optical substrate 30 as shown in FIG. 3). The valleys 37a, 37b and 37c have different valley bottom thicknesses. There is an irregularity 42a having a non-facet flat section in the form of flat-bottom valley 37d having a particular valley bottom thickness. There is also an irregularity 42b having a non-facet flat section that is defined by an opening extending through the valley 37e present between two adjacent prism blocks 35. Such opening has side walls through the valley section. Irregularities 42c and 42d have flat bottom valleys 37f and 37g with different widths. The distribution variation shown in FIG. 5C may be further varied across the entire substrate, or repeated across the entire substrate. For example, the width could range in the order of 1.5 to 200 μm. The distribution may or may not be repeated within a range of 200 μm to 200 mm.

In another aspect of the present invention, in-kind irregularities are introduced to optical substrates that have a two or three-dimensionally varying, structured light output surface that comprises an irregular prism structure, and a non-structured, smooth, planar, light input surface. In one embodiment of the present invention, the light output surface and the light input surface are generally parallel to each other in the overall optical substrate structure (i.e., do not form an overall substrate structure that is generally tapered, concave, or convex). The irregular prism structure at the light output surface may be viewed as comprising longitudinal irregular prism blocks arranged laterally (side-by-side), defining peaks and valleys. A facet of the longitudinal irregular prism block is defined between each adjacent peak and valley. The longitudinally varying prismatic structure has one or more of the following structural characteristics. At least a plurality of the irregular prism blocks have a large end tapering to a small end, or from a large width to a narrow width, or from a large peak height to a small peak height. Adjacent peaks, adjacent valleys, and/or adjacent peak and valley are not parallel within at least a range of lateral prism blocks. The adjacent peaks, adjacent valleys, and/or peak and valley may alternate from parallel to non-parallel in an orderly, semi-orderly, random, or quasi-random manner. Similarly, the non-parallel peaks, valleys and/or peak and valley may alternate between convergence to divergence in reference to a particular longitudinal direction, in an orderly, semi-orderly, random, or pseudo-random manner. All the peaks do not lie in the same plane, and all the valleys may or may not lie in the same plane. The sections taken across the peaks and valleys in the longitudinal direction are not constant. The pitch between adjacent peaks, adjacent valleys, and/or adjacent peak and valley varies laterally across the prism blocks in an orderly, semi-orderly, random, or quasi-random manner.

The irregular prism structure at the light output surface may also be viewed as comprising side-by-side or lateral rows of irregular prism blocks, wherein each longitudinal row of irregular prism blocks may be viewed as comprising a plurality of irregular prism blocks connected end to end in a continuous manner. In one embodiment, the smaller end of one prism block is connected to the smaller end of another prism block along the same row, and the larger end of one prism block is connected to the larger end of another prism block along the same row. The lateral adjacent peaks, adjacent valleys, and/or adjacent peak and valley are not parallel. The peak and valley structure across the prism blocks may have further structural characteristics similar to the previous embodiment. The adjacent irregular prism blocks may be irregular longitudinal sections having the same length, or random or quasi-random irregular sections having different lengths. In yet another embodiment of the present invention, one or more facets of each prism block sections may be substantially flat, or curved (convexly and/or concavely).

The foregoing optical substrate structure has been discussed in copending U.S. patent application Ser. No. 11/450,145, which had been incorporated by reference herein.

Figure 6:
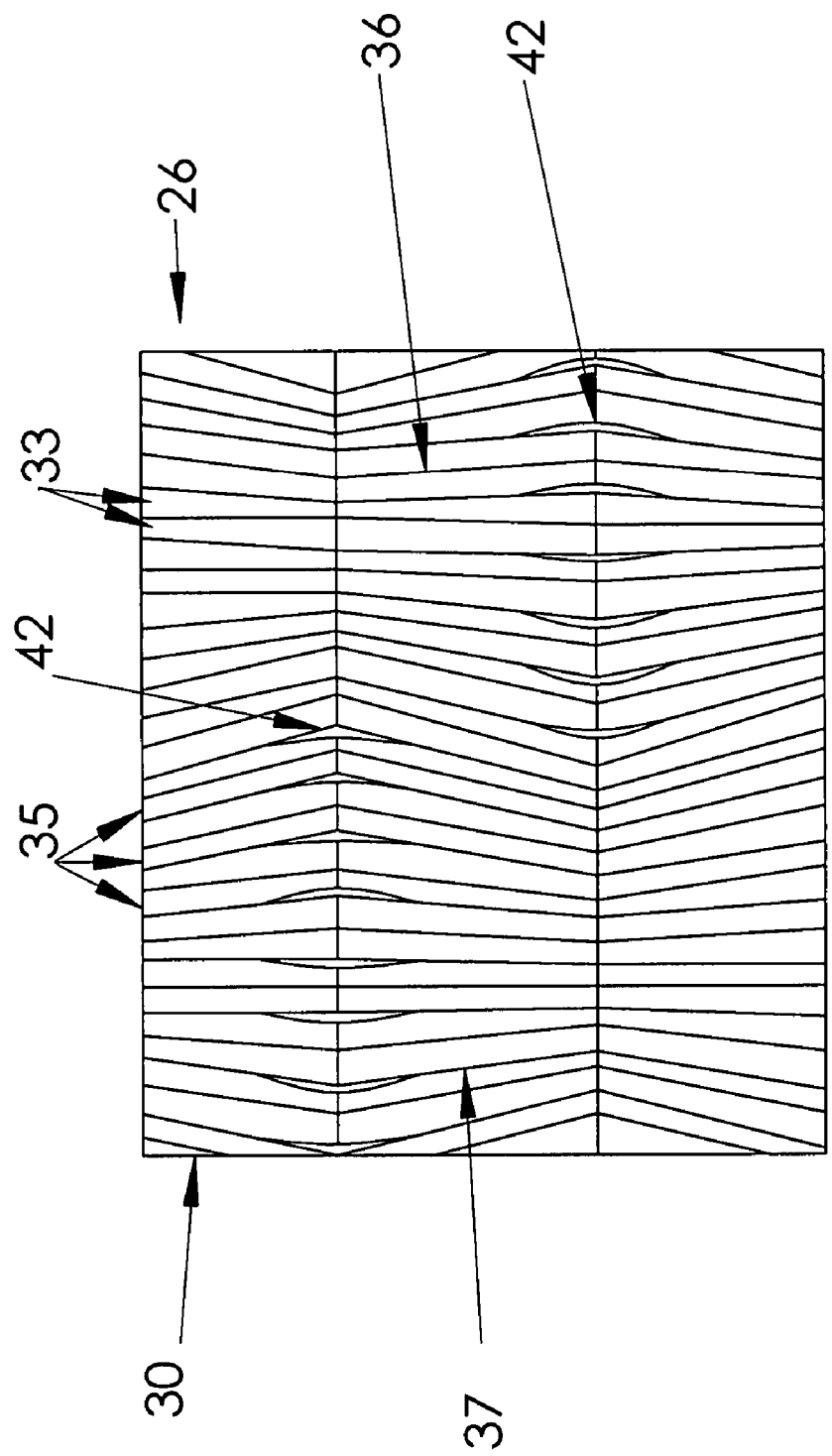
FIGS. 6 and 7 are schematic plan views of the structured light output surfaces of optical substrates, in accordance with further embodiments of the present invention.
Figure 7:
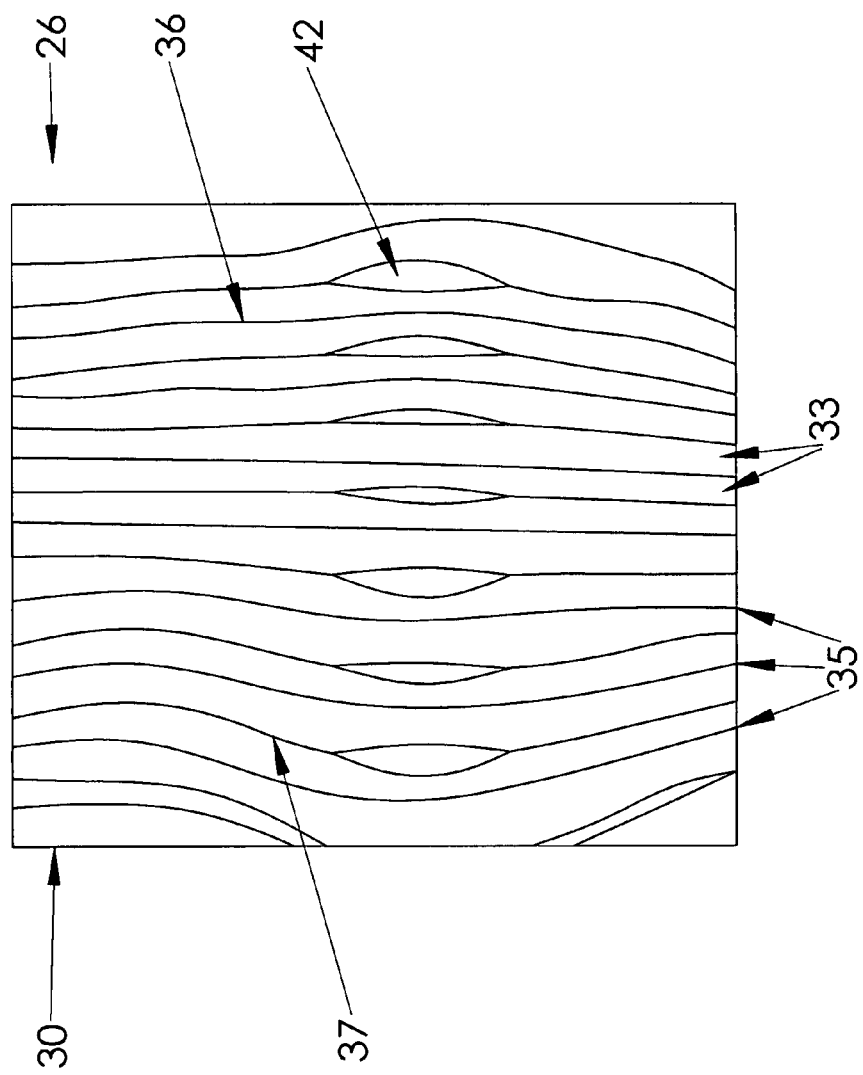

FIGS. 6 and 7 illustrate the top plan view of peaks and valleys of prism blocks having at least some of the above noted characteristics. (Note, in FIGS. 6 and 7, defects 40 are not shown to simplify illustration and discussion.) FIG. 6 represents the embodiment in which the irregular prism blocks are arranged in a zig-zag pattern. FIG. 7 represents the embodiment in which the irregular prism blocks are arranged to form a curved pattern. FIGS. 6 and 7 illustrate the top plan view of optical substrate 30 of luminance enhancement film 26. In these figures, peaks 36 and valleys 37 of the prism blocks 35 are not parallel (i.e., in a lateral x-direction) over a range of laterally and/or longitudinally adjoining prism blocks 35. Some of the valleys 37 and/or peaks 36 may not lie in the same horizontal plane within the substrate, as the facets of the prism blocks of one row intersect the facets of the prism blocks of another row, with the lines of intersection of the facets (i.e., the valleys) at different heights from the light input surface 32, depending in part on the width of the prism blocks. It is noted that in the embodiments of FIGS. 6 and 7, one prism block 35 intersect another prism block 35 in both the longitudinal and lateral directions.

In the embodiment of FIG. 7, the peaks 36 and/or valleys 37, and/or the facets 33 of one or more prism blocks 35 may be substantially curved (convex and/or concave) in the plane of the optical substrate 30. The peaks 36 and/or valleys 37 may follow wavy lines. The vertex angle of the peaks 36 of a wavy prism block may or may not have a constant angle at x-z plane sectional views along the y-direction. It is noted that on either side of a peak 36, other than making both facets 33 curved, one facet 33 may be curved and the other facet 33 may be flat. Different peaks 36 follow different curves, which may include a section of only one curvature, or many sections having different curvatures in a random, quasi-random, orderly or semi-orderly manner along a particular peak. As shown in FIG. 7, adjoining prism blocks across the structured surface may have different curved or wavy peaks and/or facet surfaces, having curvatures differing in a random, quasi-random, orderly or semi-orderly manner.

In both FIGS. 6 and 7, non-facet flat irregularities 42 are provided. Specifically for the specific embodiments illustrated, the irregularities 42 are in the form of flat-bottom valleys in a longitudinal gap form of a limited length between adjacent prism blocks 35. The prism blocks 35 may or may not have different lengths of segment, different heights, different curvature, and different sizes at both ends of a single prism and/or the prisms. The shapes of these irregularities 42 are varied by the lengths, heights, curvatures and sizes of the prisms accordingly.

The irregularities are schematically shown to be distributed in a row in a lateral direction, but other distribution may be adopted, in a random, quasi-random, orderly or quasi-orderly manner. These additional embodiments may have irregularities 42 that share features and characteristics of those irregularities discussed in connection with earlier embodiments.

As an example to illustrate the relative dimensions of an optical substrate in accordance with the present invention, the peak heights are on the order of 10 to 200 micrometers, the valley heights (bottom thickness) are on the order of 0.3 to 10 micrometers, the thickness of the base layer 31 is on the order of 25 to 1000 micrometers. The foregoing dimensions are intended to illustrate the fact that the structured surface features are microstructures, in the micrometers range. By way of example, the overall size of the area of the optical substrate may vary on the order of 2 mm to 10 m in both width and length (and even larger dimensions possible), depending on the particular application (e.g., in a flat panel display of a cellular phone, or in a significantly larger flat panel display of a TV monitor). The characteristic size of the prism blocks on the structured surface of the optical substrate need not change appreciably with different overall optical substrate size.

The optical cosmetic defect masking effects of the intentionally introduced predefined irregularities would depend on at least one of the following factors (e.g., relating to the non-facet flat sections, per unit area of the optical substrate, in relation to anticipated defects): (a) physical attributes, such as number, dimension, size, shape, geometry, types and combination of such physical attributes, (b) coverage of introduced irregularities, such as area, distribution pattern, mixture/combination of types of irregularities; (c) relationship of the irregularities to the anticipated structural defects and the physical attributes and coverage thereof; and (d) the contrast and resolution of features (e.g., defects 40, irregularities 42, etc.) perceivable in an image (e.g., by the-naked eyes of an average person). Accordingly, such factors are taken into consideration when predefining the irregularities to be intentionally introduced into the optical substrate. Concerning (d), it is noted that contrast of a feature, e.g., a defect (e.g., non-facet flat section of a flat-bottom valley) in relation to its surrounding areas in an image allow such feature to be perceivable by naked eyes (e.g., as a white spot). Further, when there are sufficient irregularities distributed, the intended distribution of discrete irregularities creates a more uniformed perception that reduces the prominence of isolated defects. In addition, where the distance between two features is closer than the resolution of naked eyes, the naked eyes may no longer be able to perceive and resolve the features as separate and distinct. Therefore, more closely spaced irregularities may further create a blended image appearance to mask or reduce perceivable defects.

The purpose to distribute the irregularities is to appropriately allocate irregularities over the whole structured light output surface, so that when viewed by naked eyes, the whole surface would look like a uniform plane. Each single irregularity should not be seen individually, because they are so small that they would not be perceived by the capability of a viewer's eyes with respect to resolution or contrast between the areas with and without irregularity. The size of each irregularity and the distances between adjacent irregularities either in longitudinal (y) or on transverse (x) direction are defined also with this purpose in mind. The structural irregularities should be in sufficient presence to substantially mask at least small optical cosmetic defects anticipated and/or typically encountered in the manufacturing process and/or subsequent handling, which would otherwise be observable in the finished luminance enhancement film, and/or when it has been placed into service in an LCD panel, to a person's naked eye.

For example, a number of scratched spots with a width about 9 µm and a length from 15 to 40 µm is lined up as a 500 µm (over 10 prisms) white line defect which could be masked by distributing non-facet flat sections with a width of about 5 µm and a length between 60 and 100 µm randomly. All these scratched spot defects are blended together with the irregularities and provides a blended view that would be perceived as being more uniform in image quality.

The optical substrate 30 may be formed with an optically transparent material, such as acrylic. The base substrate 31 may be of PET material, but may be made from the same transparent material as the optical substrate 30, which provides additional structural support to the relatively thin optical substrate 30. The optical substrate 30 may be flexible enough to be manufactured in a roll, which is laid on and bonded to the separate base substrate 31. While the thickness of the base substrate may be on the order of 25 to 1000 micrometers thick, the thickness of the base substrate may be thinner or thicker than this range, depending on the particular application. Generally, though not required, larger size optical substrate may have a thicker base substrate to provide better support, and a smaller size optical substrate may require a thinner base substrate for smaller scale applications.

The predefined irregularities intentionally introduced into the structured optical substrate 30 may be formed by prior art processes for forming microstructures on optical substrates, which are configured to provide the predefined structural irregularities in accordance with the present invention. For example, the structured surface of optical substrate of the present invention may be generated in accordance with a number of process techniques, including micromachining using hard tools to form molds or the like for the prismatic profile having the predefined structural irregularities described above. The hard tools may be very small diamond tools mounted on CNC (Computer Numeric Control) machines (e.g. turning, milling and ruling/shaping machines). Furthermore, known STS (Slow Tool Servo) and FTS (Fast Tool Servo) are examples of the devices. U.S. Pat. No. 6,581,286, for instance, discloses one of the applications of the FTS for making grooves on an optical film by using thread cutting method. To provide predefined structural irregularities, these machines may include certain perturbation means to assist the tools moving with small shifts and making prisms, and hence non-facet flat irregularities having different levels of irregularities. Known STS, FTS may include ultrasonic vibration apparatus to provide perturbation or vibration to accomplish structural irregularities predefined in the mold. By using the devices to form surfaces in the mold in relation to increasing degrees of freedom, three-dimensionally varying regular and/or irregular prisms and flats of the structured surfaces of the optical substrates disclosed above can be obtained.

The master may be used to mold the optical substrate directly or used in electroforming a duplicate of the master, which duplicate is used to mold the optical substrate. The mold may be in the form of a belt, a drum, a plate, or a cavity. The mold may be used to form the prismatic structure on a substrate through hot embossing of the substrate, and/or through the addition of an ultraviolet curing or thermal setting materials in which the structures are formed. The mold may also be used to form the optical substrate through injection molding. The substrate or coating material may be any organic, inorganic or hybrid optically transparent material and may include suspended diffusion, birefringent or index of refraction modifying particles.

While the foregoing embodiments are illustrated and discussed to include an optical substrate 30 supported by a separate base layer 31, it is within the scope and spirit of the present invention that the base layer 31 is not present, but the optical substrate may have a base portion which may be unitary or monolithic to the prism blocks 35 in the structured surface (i.e., formed from the same piece of material). Such base portion would be equivalent to, in place of, and share similar characteristics as, the separate base layer 31 discussed above. One can view an optical substrate having a unitary base portion to be comprising a prism structured layer and an adjoining base layer, wherein such two layers are in a continuum, monolithic structure. Further, a separate base layer may be provided in addition to such base portion. The base portion, and/or base layer, should be of sufficient thickness to provide structural integrity to the final luminance enhancement film.

While the anticipated defects 40 and predefined irregularities intentionally introduced are described as non-facet flat sections in the illustrated embodiments herein (discussed above and to be discussed below), if the anticipated defects in the optical substrate are other than non-facet flat sections, the in-kind irregularities intentional introduced into the optical substrate would likewise take on in-kind attributes other than non-facet flat sections.

While the above-illustrated embodiments refer to intentionally introducing predefined in-kind irregularities to mask anticipated defects, in another aspect of the present invention, the irregularities introduced need not be in-kind to all the defects. Regardless of defects anticipated, the irregularities introduced may simply be predefined non-facet flat sections (e.g., flat-bottom valleys, and/or flat-top peaks, and/or openings exposing sections of underlying base layer). This may still mask defects beyond non-facet flat section defects found on the prism structure of the optical substrate created by, such as, for example, scratches, cutting marks, cracks, indentations and/or other unintended structural defects in the prism structure, and/or foreign particles or materials introduced during molding process, which may or may not be subsequently released from the prism structure. The defects may be found anywhere on the prism structure (e.g., prism peaks, valley and/or facets, and/or underlying layer, if present, which supports the optical substrate).

The predefined irregularities introduced may not mask all types of defects present in an actual luminance enhancement substrate. The predefined irregularities to be deployed in an actual luminance enhancement substrate may comprise several types of irregularities, including non-facet flat sections, in-kind or otherwise, and/or other irregularities that are neither in-kind nor non-facet flat sections, or a combination of the foregoing.

Further, the following variations are well within the scope and spirit of the present invention. The peak and valley vertex angles may or may not vary across laterally adjoining rows. It is noted that the geometries (e.g., overall size, peak and valley angles, etc.) may be different for different prism blocks 35 in the optical substrate 30. The pitch between adjacent peaks 36, adjacent valleys 37, and/or adjacent peak 36 and valley 37 may vary in an orderly, semi-orderly, random, or quasi-random manner. It is noted that an array, pattern or configuration of a group of random irregular prism blocks may repeat over a range of area or length over the overall structured light output surface of the optical substrate 30, resulting in an overall orderly, semi-orderly or quasi-random pattern or arrangement for the overall optical substrate. Adjacent peaks, adjacent valleys, and/or adjacent peak and valley may or may not be parallel within at least a range of lateral prism blocks. The adjacent peaks 36, adjacent valleys 37, and/or adjacent peak 36 and valley 37 may alternate from parallel to non-parallel, in an orderly, semi-orderly, random, or quasi-random manner. Similarly, adjacent non-parallel peaks 36, adjacent valleys 37 and/or adjacent peak 36 and valley 37, may alternate between convergence to divergence (in reference to the same general longitudinal direction of the prism blocks), in an orderly, semi-orderly, random, or pseudo-random manner. Sections of the optical substrate 30 taken across the peaks 36 and valleys 37 in an x-z plane at various locations along the y-direction and/or in a general longitudinal direction of a particular peak or valley may or may not be constant.

Figure 8:
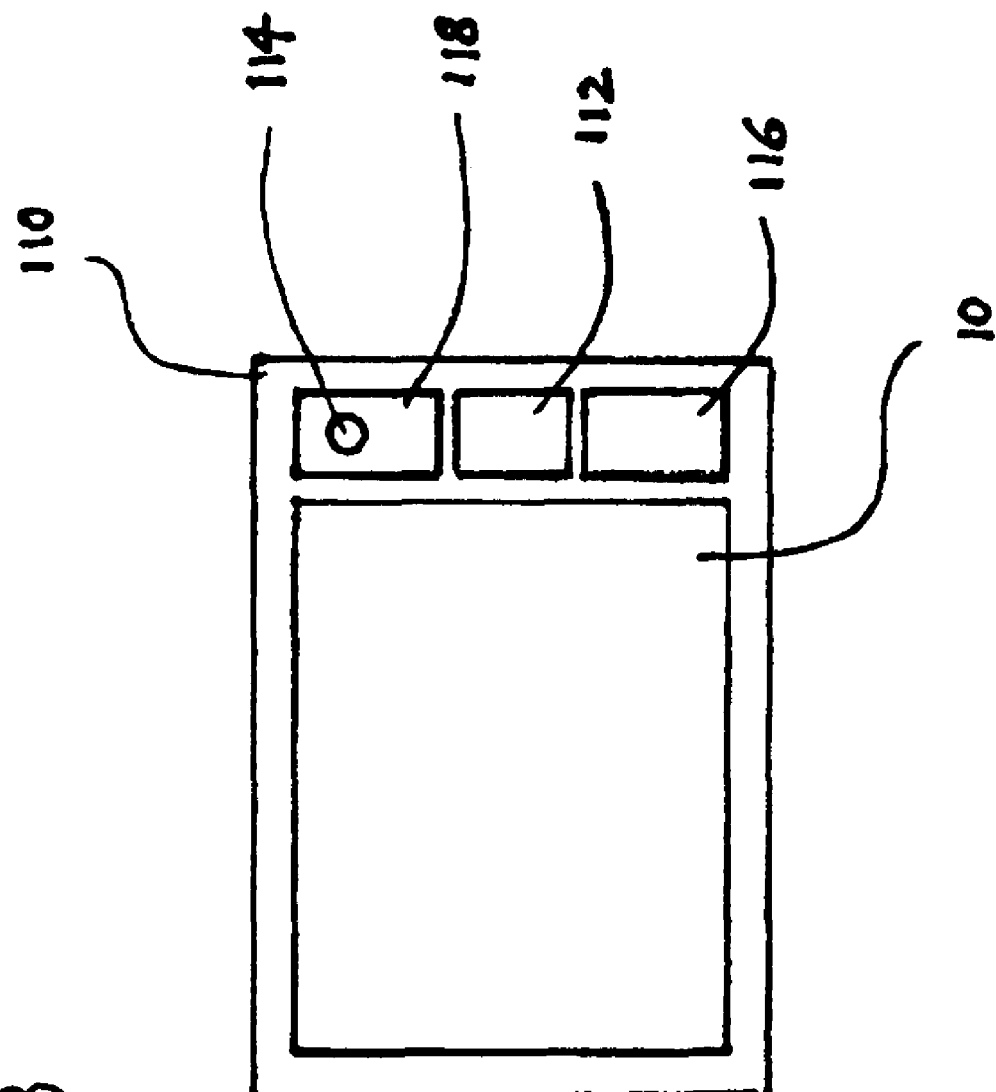
FIG. 8 is a schematic view of an electronic device comprising an LCD panel that incorporates the inventive optical substrate of the present invention, in accordance with one embodiment of the present invention.

In accordance with the present invention, the optical substrate comprises a prismatic, structured light output surface having predefined, intentionally introduced irregularities, which enhances brightness and masks otherwise user perceivable optical cosmetic defects, when applied in an LCD for example. An LCD incorporating the inventive optical substrate in accordance with the present invention may be deployed in an electronic device. As shown in FIG. 8, an electronic 110 (which may be one of a PDA, mobile phone, television, display monitor, portable computer, refrigerator, etc.) comprises the inventive LCD 10 (FIG. 2) in accordance with one embodiment of the present invention. The LCD 10 comprises the inventive optical substrate described above. The electronic device 110 may further include within a suitable housing, a user input interface such as keys and buttons (schematically represented by the block 116), image data control electronics, such as a controller (schematically represented by block 112) for managing image data flow to the LCD panel 10, electronics specific to the electronic device 110, which may include a processor, A/D converters, memory devices, data storage devices. etc. (schematically collectively represented by block 118), and a power source such as a power supply, battery or jack for external power source (schematically represented by block 114), which components are well known in the art.

While particular embodiments of the invention have been described herein for the purpose of illustrating the invention and not for the purpose of limiting the same, it will be appreciated by those of ordinary skill in the art that numerous variations of the details, materials, and arrangements of parts may be made without departing from the scope of the invention as defined in the appended claims.

The invention claimed is:

1. A method of making a luminance enhancement substrate, comprising forming an optical substrate, wherein the optical substrate comprises a planar light input surface at one side of the optical substrate, and a structured light output surface at an opposite side of the optical substrate, wherein predefined structural irregularities distributed in the structured light output surface are formed in the optical substrate, whereby certain user perceivable structural defects that have been unintentionally included in the optical substrate can be masked by the structural irregularities, wherein the structured light output surface comprises prismatic structures defined by facets, and wherein the structural irregularities comprise a structure corresponding to a non-facet flat section.

2. The method of making a luminance enhancement substrate as in claim 1, wherein the structural defects comprise non-facet flat sections in the structured light output surface, and wherein the structure of the structural irregularities comprises an in-kind structure to the structural defects.

3. The method of making a luminance enhancement substrate as in claim 1, wherein the optical substrate is formed by a molding process, wherein the mold is formed by predefining structural irregularities in a surface in the mold which corresponds to the structured light output surface, whereby the structural irregularities are intentionally introduced to the optical substrate formed by the molding process.

4. A method of making a luminance enhancement substrate, comprising forming an optical substrate, wherein the optical substrate comprises a planar light input surface at one side of the optical substrate, and a structured light output surface at an opposite side of the optical substrate, wherein predefined structural irregularities distributed in the structured light output surface are formed in the optical substrate, whereby certain user perceivable structural defects that have been unintentionally included in the optical substrate can be masked by the structural irregularities, wherein the structured light output surface comprises valleys and peaks, and wherein the structure of the structural irregularities corresponds to a flat-bottom valley.

5. The method of making a luminance enhancement substrate as in claim 4, wherein the optical substrate is formed by a molding process, wherein the mold is formed by predefining structural irregularities in a surface in the mold which corresponds to the structured light output surface, whereby the structural irregularities are intentionally introduced to the optical substrate formed by the molding process.

6. The method of making a luminance enhancement substrate as in claim 5, wherein the structural irregularities are predefined in the mold in anticipation of structural defects that are inherent in the molding process and/or subsequent handling of the optical substrate.

7. The method of making a luminance enhancement substrate as in claim 6, wherein the structural irregularities are predefined in the mold based on consideration of one or more of the following factors relating to the structural irregularities in relation to anticipated defects, per unit area of the optical substrate: (a) physical attributes, such as number, dimension, size, shape, geometry, types and combination of such physical attributes, (b) coverage of introduced irregularities, such as area, distribution pattern, mixture/combination of types of irregularities; (c) relationship of the irregularities to the anticipated defects and the physical attributes and coverage thereof; and (d) contrast and resolution of defects and irregularities perceivable in an image by the naked eyes of an average person; and
wherein the structural irregularities are in sufficient presence in the structured light output surface to substantially mask at least small structural defects anticipated and/or typically encountered in the molding process and/or subsequent handling, which would otherwise be observable in the finished luminance enhancement substrate, and/or when it has been placed into service in an LCD panel, to a person's naked eye.

8. The method of making a luminance enhancement substrate as in claim 4, further comprising a base layer supporting the light input surface of the optical substrate, wherein the structure of the structural irregularities corresponding to a flat-bottom valley is defined by at least one or (a) an opening in the light input surface exposing the base layer, and (b) a flat-bottom valley having a valley bottom thickness above the base layer.

9. The method of making a luminance enhancement substrate as in claim 4, wherein the structural defects comprise a structure corresponding to at least one of a flat-bottom valley and a flat-top peak.

10. The method of making a luminance enhancement substrate as in claim 9, further comprising a base layer supporting the light input surface of the optical substrate, wherein the structure of the structural irregularities corresponding to a flat-bottom valley is defined by at least one or (a) an opening in the light input surface exposing the base layer, and (b) a flat-bottom valley having a valley bottom thickness above the base layer.

11. The method of making a luminance enhancement substrate as in claim 4, wherein the structural irregularities comprise an in-kind structure to the structural defects.

12. The method of making a luminance enhancement substrate as in claim 11, wherein the structured light output surface comprises prismatic structures defined by facets, and wherein the structural irregularities comprises a structure corresponding to a non-facet flat section.

13. The method of making a luminance enhancement substrate as in claim 4, wherein the structural irregularities are distributed across the optical substrate in at least one of orderly, semi-orderly, random, and quasi-random manner.

14. The method of making a luminance enhancement substrate as in claim 4, wherein the structural irregularities comprise at least one of an in-kind structure to the structural defects, a structure comprising a non-facet flat section, and a combination thereof.

15. The method of making a luminance enhancement substrate as in claim 4, further comprising a base layer supporting the light input surface of the optical substrate.

16. The method of making a luminance enhancement substrate as in claim 4, wherein the structured light output surface comprises prismatic structures defined by facets, wherein the prismatic structures comprises prisms that are similar across the structured light output surface.

17. The method of making a luminance enhancement substrate as in claim 16, wherein the prisms comprise regular prisms, or prisms symmetrical about a longitudinal direction.

18. A method of enhancing brightness of an image rendered by a flat panel display, comprising:
providing a display module that emits light in accordance with an image; and
providing a luminance enhancement substrate comprising an optical substrate made by the method as in claim 4, whereby brightness of the image is enhanced by the structured light output surface.

19. A method of making a flat panel display, comprising:
providing a display module emitting light in accordance with an image; and
providing a luminance enhancement substrate comprising an optical substrate made by the method as in claim 4, whereby brightness of the image is enhanced by the structured light output surface.

20. A method of making a luminance enhancement substrate, comprising forming an optical substrate, wherein the optical substrate comprises a planar light input surface at one side of the optical substrate, and a structured light output surface at an opposite side of the optical substrate, wherein predefined structural irregularities distributed in the structured light output surface are formed in the optical substrate, whereby certain user perceivable structural defects that have been unintentionally included in the optical substrate can be masked by the structural irregularities, wherein the structured light output surface comprises valleys and non-flat top peaks, and wherein the structure of the structural irregularities corresponds to a flat-top peak.

* * * * *